(12) United States Patent
Harris et al.

(10) Patent No.: US 6,904,438 B2
(45) Date of Patent: Jun. 7, 2005

(54) METHOD AND SYSTEM FOR CHANNEL COUNT AND POWER CONTROL IN OPTICAL NETWORKS

(75) Inventors: David Harris, Jerusalem (IL); Ilan Halevi, Petach-Tikva (IL)

(73) Assignee: ECI Telecom Ltd., Petach Tikva (IL)

( * ) Notice: Subject to any disclaimer, the term of this patent is extended or adjusted under 35 U.S.C. 154(b) by 647 days.

(21) Appl. No.: 09/962,337

(22) Filed: Sep. 26, 2001

(65) Prior Publication Data

US 2003/0046293 A1 Mar. 6, 2003

(30) Foreign Application Priority Data

Sep. 4, 2001 (IL) .................................................. 145262

(51) Int. Cl.$^7$ .............................................. G06F 17/30
(52) U.S. Cl. ............................................ 707/102; 398/45
(58) Field of Search .............................. 707/102, 104.1; 398/45, 43

(56) References Cited

U.S. PATENT DOCUMENTS 6,072,601 A * 6/2000 Toyohara ..................... 358/484
6,304,347 B1 * 10/2001 Beine et al. .................. 398/38
6,559,985 B1 * 5/2003 DeGrange et al. ............. 398/5
6,563,615 B2 * 5/2003 Milton et al. .................. 398/1

FOREIGN PATENT DOCUMENTS

| EP | 0 936 760 A2 | 8/1999 |
| EP | 0 936 769 A2 | 8/1999 |
| EP | 1 006 682 A2 | 7/2000 |
| WO | WO 99/21302 | 4/1999 |

* cited by examiner

Primary Examiner—Wayne Amsbury
(74) Attorney, Agent, or Firm—Browdy and Neimark, P.L.L.C.

(57) ABSTRACT

There is proposed a technique for counting channels at a node of a multi-channel optical network, where the node is connected to a following node and a preceding node by an optical communication line carrying a plurality of information optical channels. The technique comprises exchanging of information structures between the nodes, such that each of the information structures specifies particular optical information channels which are currently in use at a predetermined network section or node.

20 Claims, 3 Drawing Sheets

METHOD AND SYSTEM FOR CHANNEL COUNT AND POWER CONTROL IN OPTICAL NETWORKS

FIELD OF THE INVENTION

The present invention relates to a technique for channel count in multi-channel optical telecommunication networks and for controlling and regulating the power level of transmitted optical signals, especially in the case of a fiber cut.

BACKGROUND OF THE INVENTION

There are a number of problems known in the field of optical communications, which concern regulating power of optical transmission in case of a fiber cut.

One of the problems is shutting down or reducing the power of an optical amplifier producing a light signal in the case of fiber cut or other hazardous events in the optical line transmitting the signal.

In point to point optical applications, where only amplifiers can be inserted between two terminal points, a fiber cut in any section of the optical link would allow the shut down of the whole link between the terminal stations.

In so-called Optical Ring, Chain, Mesh and other advanced network configurations every site can possibly contain either optical amplifiers or Optical Add Drop Multiplexers (OADM), or both. In the advanced network configurations, an optical trail may start and terminate at any site according to a customer's use. This fact rises a major survivability problem which never existed in the original point to point applications. In such configurations, a fiber cut in a span/section beyond the end points of a specific optical trail must not have any effect on the performance of any such optical trail. Usually, control systems handling optical transmission in the Ring and Chain configurations take care of the above problem.

Some of the presently used systems for DWDM networks introduce a so-called channel count mechanism. This mechanism transmits the number of active channels in the link to all the amplifiers in that link so they can modify their output power accordingly. In order to maintain balance in such a system, the number of channels dropped at a particular node should be approximately equal to the number of channels added at this node. However, this mechanism reacts incorrectly to events such as a fiber cut in a specific span of a link with OADMs (Optical Add Drop Multiplexers). Indeed, a fiber cut drastically changes the actual number of channels at more than one successive nodes, so the output power of the amplifiers in the link will not be correctly adjusted. The erroneous adjustment will most likely cause a degradation in optical performance of the system.

U.S. Pat. No. 6,072,601 describes an optical fiber amplifier capable of determining a number of optical channels actually inputted to it, thereby allowing, through self-control, both optimum operation conditions in accordance with the number of transmission channels, and the maintenance of the transmission performance. The optical fiber amplifier comprises an optical signal amplifier and a control circuit. The control circuit section comprises a branch circuit that branches off and extracts a portion of the transmitted optical signal power, and a channel counter that inputs a portion of the branched optical signal power and based on that counts the number of channels of the transmitted optical signals. The control circuit controls the amplification factor of the optical signal amplifier in accordance with the number of channels counted at the channel counter. The system counts the channels on the ad-hoc basis but is unable to predict the number of active optical channels in case of a fiber cut, which would be important to prevent ill effects of transient periods in the network until the channel count mechanism is updated.

Presently, there is no known methods/systems which dynamically count channels and adjust power in an optical communication system so, that occurrence of a fiber cut would not lead to an unbalancing of the system.

OBJECT OF THE INVENTION

It is therefore the main object of the present invention to provide a method and a system for optical channels count and, based on that, for controlling power in multi-wavelength optical communication networks comprising OADMs, which would ensure the dynamic power equalization (both in normal regimes of operation and in cases of a fiber cut).

Additional objects of the invention will become apparent as the description proceeds.

SUMMARY OF THE INVENTION

The Inventors have realized that when a fiber cut occurs in network configurations including OADMs (for example, Chain or Ring configurations of optical networks), the actual channel count along the fiber following the point of failure is equal to 0, and remains 0 until any OADM along the link adds its "ADD" channels to the fiber. After the next OADM, the number of optical channels in the fiber is changed again, and so on.

In other words, it has been shown that the main problem in controlling and equalizing power in optical network configurations is the channel count principle, which should be universal to enable the adequate functioning of the system both in its proper condition, and in cases of a fiber cut.

To achieve the purpose of the invention, a method is provided for performing a channel count at a node of a multi-channel optical network, the node being connected to a following node and a preceding node by an optical communication line capable of carrying a plurality of information optical channels, the method comprising exchanging of information structures between the nodes, wherein each of the information structures specifying particular optical information channels in use at a particular network section.

The above method comprises steps of:

pre-setting at the node: an information structure DRP indicating specific information optical channels to be dropped at said node, and an information structure ADD indicating specific information optical channels to be added at said node, obtaining an information structure RCV indicating specific information optical channels received from the preceding node, and forming an information structure FWD by using the information structures RCV, DRP and ADD, the FWD indicating specific information optical channels to be forwarded from said node to the following node, and thereby informative of the number of said channels (NOC) or the so-called channel count, providing the following node with the information structure FWD serving as an RCV of the following node.

The information structure FWD (As well as the channel count NOC) can be used in the following node, and also at the current node for internal purposes, preferably for adjusting the node output power.

The above method of channel counting proves to be effective for optical networks, since in cases when a fiber cut is detected it enables maintaining the channel count and power balance in optical networks.

More particularly, the method comprises monitoring LOS (Loss Of Signal) at the input of the node for detecting a fiber cut condition, and forming the FWD as follows:

$$FWD=\{[RCV-DRP] \text{ and } [not(LOS)]\}+ADD.$$

The mentioned information structures may be obtained and formed in any suitable form, for example in the form of text lists, analog information blocks, a binary form, etc.

The fiber cut condition LOS can be detected using various techniques known in the art. One of such techniques will be mentioned below.

It should be understood that the node is considered to include all equipment between its output and the output of the preceding node; such equipment may include one or more amplifiers, one or more OADMs, fibers and other network elements in combinations. Owing to that, the ADD and DRP informational structures of a particular node are cumulative values which are composed from information about the added and dropped channels of all the equipment of the node. For example, if the node comprises just an inline optical amplifier, its ADD and DRP will be pre-set to "0". In view of the above, the nodes in the network are considered to be linked to one another directly, just by optical communication lines so, that the RCV of a particular node is equal to the FWD of the node preceding said particular node.

According to the definition of the node for the purpose of this invention, it is considered to comprise a network element that is capable of performing the above processing; such a network element can be called an "active element". Other network elements (to be considered as "passive elements") may exist in the network between two such active elements, and although the passive elements may have an effect on the actual active channels, the above-defined processing will be performed only at the next downstream active network element taking, however, into account the relevant information regarding the passive network element(s).

The method preferably comprises:

obtaining the information structure RCV from the preceding network node and forwarding the information structure FWD to the following network node via a supervisory channel.

The supervisory channel should be understood as any communication link between network nodes serving for control and management purposes. For example, it may be created by the network management system which is in control communication with each of the network nodes.

According to the most preferred version, the method preferably comprises providing the supervisory channel using an optical channel transmitted along with the information optical channels via a common optical communication link, i.e., a common optical fiber or cable (as defined in the ITU-T Standard Recommendation G.709).

In one way of practically implementing the novel principle, when the supervisory channel is transmitted along the information optical channels, the step of monitoring LOS for detecting a fiber cut condition comprises:

monitoring at the node whether there is a Loss Of Signal condition with respect to all the information optical channels (LOS-line), monitoring at the node whether there is a Loss Of Signal condition with respect to the supervisory optical channel (LOS-sup), and performing the step of forming the information structure FWD as follows:

$$FWD=\{[RCV-DRP] \text{ and } [not(LOS\text{-line and } LOS\text{-sup})]\}+ADD.$$

Most preferably, the messages are obtained and formed at the node in a binary form.

In one example which can easily be implemented in practice, the method may comprise obtaining any one of said three information structures RCV, DRP and ADD and forming the fourth information structure message FWD as a binary word (or map) wherein each information optical channel of the multi-channel optical network is represented by a binary value of a particular bit of the binary word (map) in one-to one correspondence.

In other words, the method may include obtaining and forming the binary words (maps) RCV, DRP, ADD, FWD using a similar structure where optical channels of the multi-channel optical network are represented by bits of the structure in one to one correspondence.

More particularly, in said most preferred version of the method, the FWD binary map is formed, per bit, from respective bits of the RCV, ADD and DRP binary maps and using the following Boolean function:

$$FWD=\{[RCV \text{ xor } DRP] \text{ and } [not(LOS)]\} \text{ or } ADD.$$

In practice, the four binary maps may be just binary words having the equal length in bits, which length is not smaller than the total number of channels in said multi-channel network; each particular bit of such a binary word acquiring the value 1 if the corresponding channel exists (active), and the value 0 if the channel does not exist (inactive) in the particular binary map.

The signal LOS is equal to "1" when a fiber cut condition is detected. For example, LOS can be considered "1" when both the LOS-line and LOS-sup are "1", i.e. when the respective conditions of loss of signal are detected simultaneously over all the fiber channels.

The channel count NOC, currently updated at each particular node according to the invention, can be used for various control and management purposes by this very node, the node following the particular node, and the Network management system.

As mentioned above, the channel count can be utilized for determining and adjusting the required output power to be provided by said network node; so the method preferably comprises a further step of forming an output power control command based on the obtained NOC (channel count).

According to another aspect of the invention, there is provided a system for counting channels at a node of a multi-channel optical network, the system being suitable for the node connected to either or both of a following node and a preceding node by an optical communication line carrying a plurality of information optical channels, the system being adapted to perform exchange of information structures between the nodes, wherein each of the information structures specifying particular optical information channels in use at a particular network section.

More particularly, the system for obtaining a channel count NOC at a node of a multi-channel optical network comprises:

memory means for obtaining and storing at the node information structures RCV, DRP and ADD, respectively specifying particular information optical channels being received at the node (RCV), dropped at the node (DRP) and added at the node (ADD), a processing unit at the node, capable of forming an information structure FWD using said stored information structures RCV, DRP and ADD, the FWD specifying particular information optical channels to be forwarded from the node, said information structure FWD being also indicative of the number of said channels (NOC) constituting the channel count, memory means for storing the FWD information structure.

The meaning of the node according to the invention was clarified above, with respect to the method. Again, the node comprises all network elements connected between its output and the output of the preceding node; such equipment may include one or more amplifiers, one or more OADMs, fibers and other network elements in various combinations. The ADD and DRP information structures will therefore represent the total respective information on the added and dropped channels of the node. Such nodes in the network are considered to be linked to one another directly, just by optical communication lines, so that the RCV of a particular node is equal to the FWD of the node preceding said particular node.

For setting and revising the optical channels to be added and/or dropped at the node, the system may further comprise a management unit being interconnected at least with the memory means storing the ADD and DRP information structures (either directly, or via the processing unit). Alternatively, these memory means may be pre-set manually, by a network operator.

The management unit may physically be located at the node, at an Element Management System, etc.

However, the management unit can be capable of selectively overriding one or more of the memory means storing said RCV, ADD, DRP and FWD. This may be required not only for pre-setting the ADD and DRP structures but, for example, for overwriting the RCV or FWD memory means when the node is assigned as a terminal node in the trail.

Preferably, the processing unit is also capable of explicitly obtaining NOC from the FWD information structure, by calculating the number of information optical channels to be forwarded from said node.

In the most preferred embodiment of the system, the processing unit is further capable of forming an output power control command to adjust output power of the node according to the NOC (channel count).

The system is preferably adapted to balance operation of the node in case of a fiber cut before the node, and to this end further comprises:

monitoring means for monitoring LOS (Loss Of Signal) at the input of the node for detecting a fiber cut condition, wherein said processing unit being adapted to calculate the FW structure as follows:

$$FWD=\{[RCV-DRP] \text{ and } [\text{not}(LOS)]\}+ADD.$$

In one preferred embodiment of the system, it further comprises at least one transceiver for receiving the RCV from the preceding node and/or for forwarding the FWD to the following node using a supervisory channel.

The supervisory or service channel is usually provided in the network and may be either a part of its central management system, or part (channel) of any communication link connecting a pair of nodes.

However, most preferably, the supervisory channel is an optical channel transmitted between the nodes along with the information optical channels and using the same physical carrier as said informational optical channels use; in this case, the means for monitoring LOS at the input of the node comprises the LOS-line detection means for monitoring LOS on the information optical channels, and further comprises the supervisory channel monitoring means for detecting a LOS-sup condition indicating Loss Of Signal in the supervisory channel incoming said node, said processing unit is adapted to calculate the FWD information structure according to the following formula:

$$FWD=\{[RCV-DRP] \text{ and } [\text{not}(LOS\text{-line and }LOS\text{-sup})]\}+ADD.$$

According to one particular embodiment of the system, the means for storing at the node said RCV, DRP, ADD and FWD are four binary registers for respectively presenting the information optical channels received at the node (RCV), dropped at the node (DRP) added at the node(ADD) and forwarded from the node (FWD) in the form of binary words (maps), structure of said four registers being similar and such that each information optical channel of the multi-channel optical network is represented in one-to one correspondence by a particular binary position in any of the binary registers, the processing unit being capable of calculating a number of information optical channels (NOC) to be forwarded from said node to the following node, using the binary word stored in the register FWD.

In the preferred embodiment of the system, the processing unit in the node is capable of building the FWD binary word (map) per bit, based on the Boolean function $$FWD=\{[RCV \text{ xor } DRP] \text{ and } [\text{not}(LOS)]\} \text{ or } ADD, \text{ where:}$$

the binary maps RCV, FWD, ADD DRP are binary words having lengths in bits, being not smaller than the total number of channels in said multi-channel network; each particular bit of a binary word acquiring the value 1 if the corresponding channel exists (active), and the value 0 if the channel does not exist (inactive) in the particular binary map;

the signal LOS is "1" when a fiber cut condition is detected. The fiber cut condition can be detected using various methods known in the art, for example by simultaneous monitoring the signals LOS-line and LOS-sup. In this case LOS is "1" when both LOS-line and LOS-sup are "1", i.e. when the respective conditions of loss of signal are detected.

Other aspects and details of the invention will become apparent as the description proceeds.

BRIEF DESCRIPTION OF THE DRAWINGS

The invention can be further described and illustrated with the aid of the attached non-limiting drawings, in which.

DETAILED DESCRIPTION OF THE INVENTION

Figure 1:
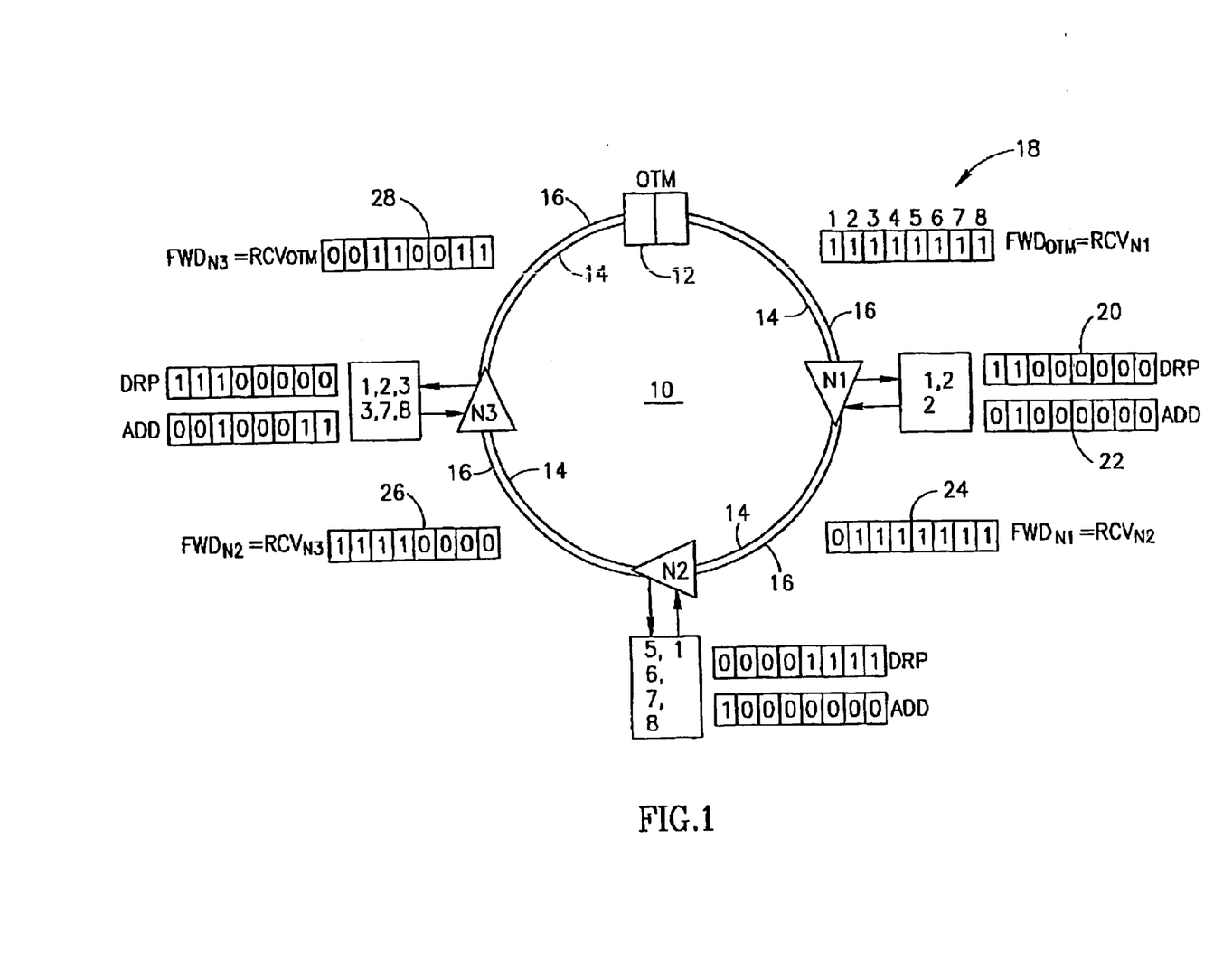
FIG. 1 is a schematic pictorial diagram illustrating the ring configuration of a multi-channel optical network and explaining the method of channel count according to one embodiment of the invention.

To explain the method according to the invention, FIG. 1 shows a pictorial diagram of a ring configuration 10 of a multi-channel optical network. It should be noted that the method is also applicable to a chain configuration, a mesh configuration, and other configurations of the multi-channel optical network comprising OADMs. The illustrated network section 10 comprises a number of intermediate optical nodes N1, N2 N3, and two terminal nodes combined into one node 12 marked OTM (Optical Terminal Multiplexor). Actually, if the terminal nodes are not combined, we have a chain configuration. Only one direction of the data transmission will be illustrated in this and all further figures; those skilled in the art realize that there will usually be a second chain for transmitting the data in the opposite direction between the terminal nodes, which will include the same functionality. The nodes N1, N2, N3 are schematically shown as triangles to clarify the direction of transmission which is discussed in the further description. According to the illustrated embodiment of the invention, the nodes in the ring configuration are connected to one another by an optical fiber carrying, for example, eight optical information channels which are generally indicated as an information line 14, and carrying one supervisory channel (16) which is used for transmitting data about the information channels, and this data is sent in the ring from one node to another.

In this example which is both practical and illustrative, the data in the supervisory channel is transmitted in the form of so-called binary maps (bitmaps), which in the simplest case are just binary words having the length in bits equal or more than the number of optical channels in the optical networks. (It should be noted that the data may be transmitted not only in the binary form, and not only via the supervisory channel sharing the same carrier with the information channels, but for example via a management unit.) Each bit in the binary map represents a particular optical channel in one-to-one correspondence. For example, the binary map 18 is created at the terminal node 12 to reflect that eight optical information channels are launched into the line, the map has the length of 8 bits, bears the "all ones" pattern over all the bits to indicate that each of the channels is active. Since the bitmap 18 is transmitted from the OTM node 12 to the next node N1, it constitutes a bitmap of forwarded channels (FWD) with respect to the node OTM, while representing a bitmap of received optical channels (RCV) with respect to the node N1.

Let node N1 is an OADM which is set to drop the 1-st and the 2-nd optical channels from those received, and to add information to the vacant 2-nd optical channel. These two tasks of the OADM are registered in two respective binary maps 20 and 22, being the DRP and ADD bitmaps of the node N1. In case of the proper functioning of the network, the optical channels which are to be forwarded from the node N1 can be calculated based on the three mentioned binary maps, and a binary map 24 of the forwarded channels can be built per bit, as follows:

$$FWD = \{[RCV \text{ xor } DRP] \text{ or } ADD.$$

Similar operations can be performed at each of the remaining nodes. The binary maps of the forwarded channels (18, 24, 26, 28) can be used for determining the total number of active optical channels outputted from the respective nodes—just by counting the total number of "ones" in the map. The exact number of the outgoing channels is the channel count or NOC parameter of the node which enables adjusting the output power of the node accordingly.

The described method is simple and presents a novel principle of obtaining the channel count NOC of a node by using information structures which specify channels active at a particular section of the network. This principle enables the precise and flexible regulation of power at the network nodes, even in case the tasks of the node are periodically or randomly changed (say, the selection of the added or dropped channels is changed, or a node is replaced and comprises, instead of OADM, an amplifier which does not perform adds or drops).

However, in case of a fiber cut the balance may be destroyed, since both the optical information itself, and the supervisory information on the received channels may be distorted or lost, and the nodes in the network would produce both wrong information on the outgoing optical channels, and incorrect power supply for these channels. Suppose a fiber is cut between the OTM and N1. The resulting bitmap 24 should not be the same as during the proper operation, since the information channels from the OTM are no longer received.

The improvement provided to the method and enabling the proper network operation in any condition including a fiber cut, will be described and illustrated with reference to FIG. 2.

Figure 2:
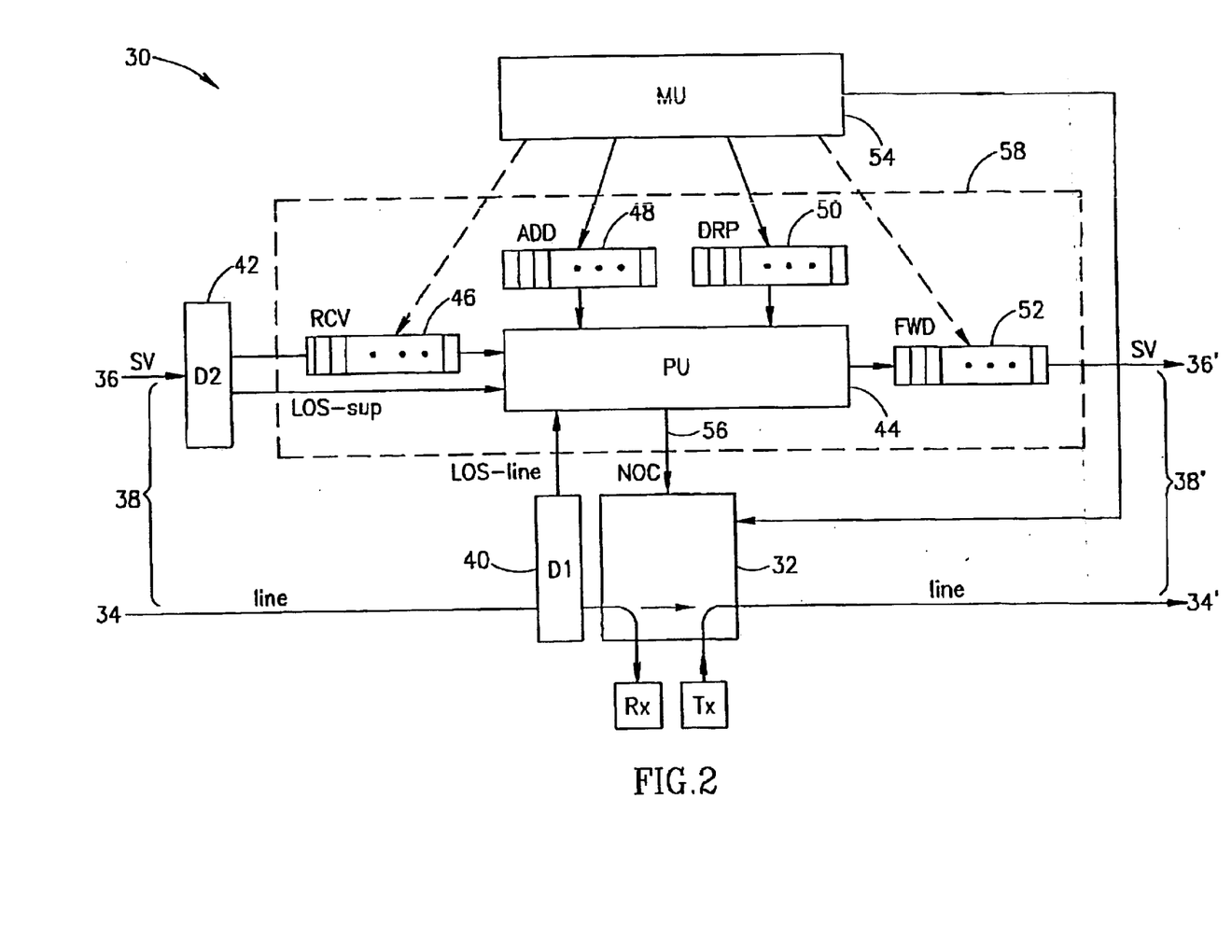
FIG. 2 is a schematic block diagram of one embodiment the system according to the invention.

FIG. 2 illustrates how the method of using binary maps for channel count can be adapted for cases of fiber cut and become a universal method. The figure shows a channel count system 30 for an optical node which, in this particular case, comprises a stand-alone OADM multiplexer schematically shown as 32. The node receives a number of informational optical channels via a so-called line 34, while binary information on the channels is sent via a supervisory channel SV marked 36. The line and the SV are carried by an optical fiber schematically marked 38.

The line 34 is equipped with a detector D1 (marked 40) sensitive to the loss of signal in the line, which issues a signal LOS-line when power in the line disappears or is reduced drastically. Practical implementations of such a detector are numerous and are known to those skilled in the art. The supervisory channel 36 is also provided with a detector 42 (D2) which reacts to the loss of signal in the channel 36 by producing the alarm LOS-sup. Both of the LOS signals are sent to a Processing Unit (PU) 44 of the node. Only when the fiber 38 is cut, both the LOS-line and LOS-sup are produced. Other combinations, when only one of the LOS signals is produced, may be caused by various circumstances. In practice, such combinations can be understood and handled as conditions different from the fiber cut.

The processing unit is associated with four registers 46, 48, 50, 52 for storing bitmaps RCV, ADD, DRP and FWD respectively. The binary map RCV is received at the node via the SV channel 36. The binary maps ADD and DRP are formed in the node according to tasks received from a management unit (MU) 54 of the OADM 32. From time to time, especially when a reconfiguring is required and/or new channels are provided, the management unit 54 issues orders to the OADM 32 concerning the channels which are to be dropped, and those which are to be added. Actually, the registers 48, 50 are updated according to the same orders which are fed to the OADM 32 by the MU 54.

The management unit 54 may be responsible of setting a so-called regime of a terminal node. In case the node provided with the channel count system 30 is a terminal node, the management unit may override any one of the four registers to bring the trail into balance.

Physically, MU 54 may be placed either centrally (in a central management system of the network), or be decentralized and placed at a corresponding node.

Let the node shown in FIG. 2 is a regular intermediate node. Based on contents of the registers 46, 48, 50 and on the result of monitoring the fiber cut situation, the processing unit forms, per bit, the content of the register 52 (channels to be forwarded from the node over the line 34') as follows:

$$FWD = \{[RCV \text{ xor } DRP] \text{ and } [\text{not}(LOS\text{-line and } LOS\text{-sup})]\} \text{ or } ADD.$$

Based on the obtained bitmap FWD, the PU calculates the total number of the channels (NOC) to be forwarded to a next node. Knowing this number, the PU 44 produces an output power command 56 for adjusting the output power of the OADM 32.

The processing unit and the associated registers responsible for concentration of the information and calculations, are indicated by a dotted contour and marked as a control block 58.

Figure 3A:
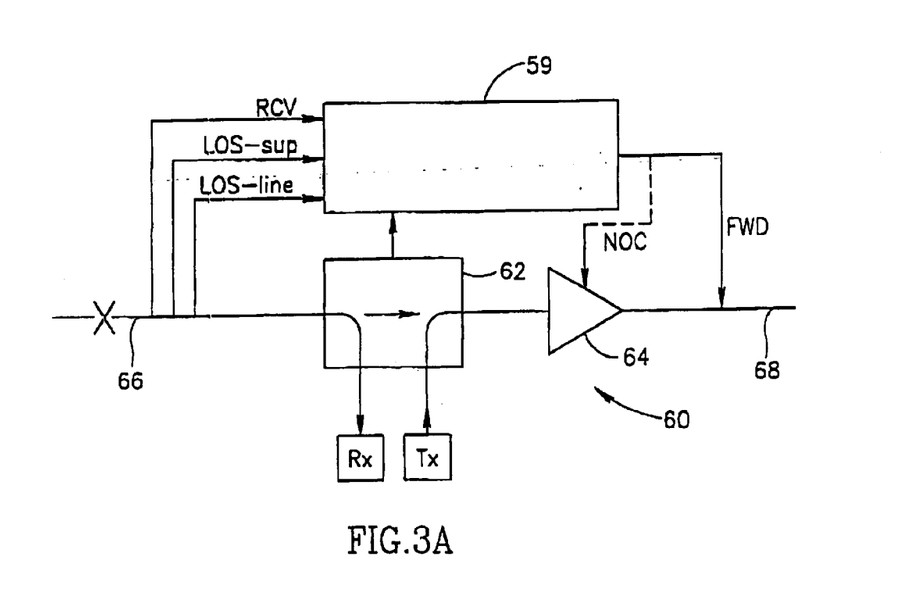
FIGS. 3a, 3b are schematic block-diagrams of practical configurations of the node in an optical network.
Figure 3B:
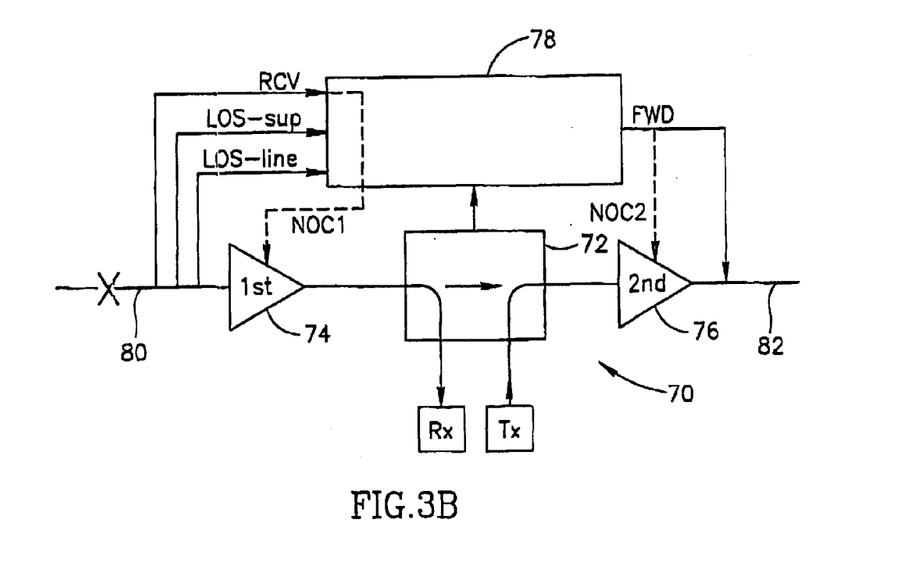

Owing to the fact that the RCV and DRP registers are taken into account only when there is no fiber cut condition (LOS-line &LOS-sup in this particular case), the method and the system provide the universal functioning of the network and proper adjustment of output power at the nodes. FIGS. 3a, 3b illustrate various configurations of the network nodes in view of the present invention.

In the simplest embodiments, the node may comprise just a so-called in-line optical amplifier (ILA), or a stand-alone OADM.

The node comprising just a stand-alone OADM has been described above in FIG. 2. In such a case, the binary registers ADD and DRP are set to comprise some particular binary information.

If the node is a stand-alone optical amplifier, and the information structures are binary, both the DRP and ADD registers can be set to "all-zero" pattern. If a fiber cut occurs before such a node, the regular calculation will bring the FWD bitmap to "0", so it will be possible to adjust the amplifier's output power to the minimum required value.

However, a standard network node usually comprises a combination of the amplifiers and OADMs. How the method and the system will be implemented at such nodes?

It should be noted, that even the stand-alone OADM multiplexer is, in practice, an OADM with an amplifier placed after the OADM. This configuration is illustrated in FIG. 3a in more detail.

In FIG. 3a, the node 60 comprises an OADM indicated 62 and its associated amplifier 64 placed after the OADM. An optical fiber 66 carries the information optical channels and a supervisory channel to the node 60, an optical fiber 66—from the node 60. Control block 59, similar but not obligatory identical to block 58 in FIG. 2, is responsible for receiving the binary map RCV from the supervisory channel, and for monitoring alarm(s) on the fiber cut condition. Though the figure shows collecting alarms both from the information channels and the supervisory channel, other ways of detecting a fiber cut can be utilized. All this information is collected from the input of the OADM 62. Also, block 59 is responsible for NOC calculation and forming the FWD binary map according to the above-mentioned Boolean function. The binary maps DRP and ADD can be formed in 59 based on information obtained directly from the OADM 62 about the added and dropped channels. The NOC result (in the form of a power output control command) is fed from the block 59 to the amplifier 64 to adjust its output power. The FWD bitmap is launched into the supervisory channel of the fiber 68 outgoing the amplifier.

In case of a fiber cut before the OADM (see the cross), the node will continue operation for transmitting the channels added at its OADM 62 and regulate the output power of the amplifier 64. The data transmission in the opposite direction (i.e., in the branch transmitting data from the node to the direction of the fiber cut—not shown) should be automatically shut down.

FIG. 3b illustrates a node 70 comprising a so-called OADM in the mid-stage, i.e., an OADM 72 having a preceding amplifier 74 called a $1^{st}$ stage amplifier and a following amplifier 76 called a $2^{nd}$ stage amplifier. A control block 78 collects the necessary information from the channels of optical fiber 80 at the input of the $1^{st}$ stage amplifier 74 and, in addition to abilities similar to those of the control block 58, provides the amplifier 74 with an output power control command based on the number of channels (NOC1) obtained from the binary map RCV only.

Actually, the $1^{st}$ stage amplifier of the node may be considered as a stand-alone amplifier forming a separate node, and the general method can be applied to it as well.

The Control block 78 also issues a binary map FWD which is to be applied to the supervisory channel of fiber 82 outgoing the $2^{nd}$ stage amplifier 76. The FWD map is determined at the block 78, based on the RCV map of the $1^{st}$ stage amplifier 74, ADD and DRP maps of the OADM 72 and considering the presence or absence of LOS condition detected at the input of the node (for example, by checking LOS-line&LOS-sup). The ADD and DRP maps can be set by a management unit (if exists), or built based on detecting active add/drop channels of the OADM. The channel count NOC2, defined from the FWD map, is sent to the $2^{nd}$ stage amplifier 76 for adjusting its output power.

So, in this embodiment, the optical output of the $1^{st}$ stage will be adjusted according to the RCV information structure of the node, while the optical output of the $2^{nd}$ stage of the node will be adjusted according to the FWD information structure of the node.

In the case of fiber cut before the node 70, the first stage of the node is shut down, while the OADM and the second stage continues working to transmit the added channels (if any). If there is no added channels, the $2^{nd}$ stage amplifier may also shut down (because of the lack of signal) but the SV will transmit the suitable information to the next node which enables its operation. This situation explains why the fiber cut condition is defined in the invention as simultaneous detection of Loss Of Signal (LOS) both in the information channels and in the supervisory channel.

Detection of the LOS-line&LOS-sup at the first stage may activate shut-down of the $2^{nd}$ stage of the node in the opposite direction. Functions of the $1^{st}$ stage of the opposite direction may stay the same as far as there is no fiber cut from the other side.

In a practical example suitable for any of the figures above, the binary maps (for example the RCV or FWD) can be represented by 10 bytes transmitted via the supervisory channel, so that 80 bits thereof are capable of representing 80 optical channels, 50 GHz spacing, used in DWDM optical networks. The 10 bytes will therefore carry a spectral representation of the actual active channels in the fiber, where the active channel is represented by "1", and a non-active channel—by "0". The sum of active channels which can be obtained from the plurality of bits (10 bytes) received at a downstream element of the node (actually, the FWD of the node) will indicate the number of active channels in the span, and is exactly the NOC parameter. According to the NOC parameter received, the node will be able to calculate the correct output power of its amplifier.

In the best mode, the described method can be implemented in optical networks comprising OADMs and provided, as recommended in the ITU-T standard G.709, with the supervisory channel in optical fibers which carry information optical channels between the network nodes. Any node or network element NE of such an optical network can be equipped with a control card comprising indicators of LOS both in the informational channels, and in the supervisory channel. The control card, to handle all the four binary maps (RCV, DRP, ADD and FWD), would comprise four 10-byte registers for storing these respective maps and a processor capable of processing signals from the indicators and current information accumulated in said registers by implementing the above-described Boolean equation. More particularly, at the card of each network element, signals LOS-line and LOS-sup are analyzed. In case the supervisory channel is alive, the optical channels are counted as defined above. In the case of simultaneous LOS in all channels of the optical fiber i.e., in case of simultaneous sharp decrease of power both in the informational channels and in the supervisory one, the card will indicate a fiber cut signal (or a real LOS signal) which should drastically affect the channel count at this particular node and prevent the node from emitting excessive output power in both directions.

While most of the prior art solutions describe the static regulation of the output power, the invention proposes the dynamic regulation which is indispensable from the point of reconfiguring the network and in cases of fiber cut. Moreover, regardless the aspect of the output power regulation, the invention provides a new accurate way of obtaining the channels count in the multi-channel optical networks, which cannot be distorted by fiber cut events.

Though the invention has been described and illustrated using only particular examples, it should be appreciated that other implementations of the inventive method and system might be proposed, and to be considered part of the invention.

What is claimed is:

1. A method for counting channels at a node of a multi-channel optical network, the node being connected to a following node and a preceding node by an optical communication line capable of carrying a plurality of information optical channels, the method comprising exchanging of information structures between the nodes, wherein each of the information structures specifying particular optical information channels in use at a network section; the method comprising steps of providing at the node: an information structure DRP indicating specific information optical channels to be dropped at said node, and an information structure ADD indicating specific information optical channels to be added at said node, obtaining an information structure RCV indicating specific information optical channels received from the preceding node, and forming an information structure FWD by using the information structures RCV, DRP and ADD, the FWD indicating specific information optical channels to be forwarded from said node to the following node, and thereby informative of the number of said channels (NOC), providing the following node with the information structure FWD serving as an RCV of the following node.

2. The method according to claim 1, further comprising monitoring LOS (Loss Of Signal) at the input of the node for detecting a fiber cut condition, and forming the FWD according to the following logic:

$FWD=\{[RCV-DRP] \text{ and } [\text{not } (LOS)]\}+ADD.$

3. The method according to claim 2, comprising providing the supervisory channel in an optical channel transmitted along with the information optical channels via a common optical communication link, wherein the step of monitoring LOS comprises:

monitoring at the node whether there is a Loss Of Signal condition with respect to all the information optical channels (LOS-line), monitoring at the node whether there is a Loss Of Signal condition with respect to the supervisory optical channel (LOS-sup), and wherein the step of forming the information structure FWD is performed according to the logic:

$FWD=\{[RCV-DRP] \text{ and } [\text{not } (LOS\text{-line and } LOS\text{-sup})]\}+ADD.$ 4. The method according to claim 1, wherein the node includes one or more network elements from a non exhaustive list comprising an optical amplifier and OADM (optical add-drop multiplexer), connected between output of the node and output of the preceding node.

5. The method according to claim 1, comprising:

obtaining the information structure RCV from the preceding network node and forwarding the information structure FWD to the following network node via a supervisory channel.

6. The method according to claim 5, comprising providing the supervisory channel in an optical channel transmitted along with the information optical channels via a common optical communication link.

7. The method according to claim 1, wherein the information structures are obtained and formed in a binary form.

8. The method according to claim 7, comprising: obtaining any one of said three information structures RCV, DRP and ADD and forming the fourth information structure message FWD as a binary map wherein each information optical channel of the multi-channel optical network is represented by a binary value of a particular bit of the binary map in one-to one correspondence.

9. The method according to claim 8, comprising forming the FWD binary map per bit, from respective bits of the RCV, ADD and DRP binary maps and using the following Boolean function:

$FWD=\{[RCV \text{ xor } DRP] \text{ and } [\text{not } (Los)]\} \text{ or } ADD.$ 10. The method according to claim 1, further comprising a step of adjusting output power of said node based on the NOC.

11. A system for counting channels at a node of a multi-channel optical network, the system being suitable for the node connected to either or both of a following node and a preceding node by an optical communication line carrying a plurality of information optical channels, the system being adapted to perform exchange of information structures between the nodes, wherein each of the information structures specifies particular optical information channels in use at a network section; the system comprising:

memory means for obtaining and storing at the node information structures RCV, DRP and ADD, respectively specifying particular information optical channels being received at the node (RCV), dropped at the node (DRP) and added at the node (ADD), a processing unit at the node, capable of forming an information structure FWD using said stored information structures RCV, DRP and ADD, the FWD specifying particular information optical channels to be forwarded from the node, said information structure FWD being also indicative of the number of said channels (NOC).

12. The system according to claim 11, wherein the node comprises one or more network elements, selected from a non-exhaustive list including an optical amplifier and OADM, connected between output of the node and output of the preceding node.

13. The system according to claim 12, wherein the node has a mid-stage OADM configuration comprising a $1^{st}$ stage optical amplifier, a $2^{nd}$ stage optical amplifier and an OADM there-between, the arrangement being such that the $1^{st}$ stage optical amplifier's output is adjustable according to the RCV information structure of the node, while the $2^{nd}$ stage optical amplifier's output is adjustable according to the FWD information structure of the node.

14. The system according to claim 11, further comprising a management unit being interconnected with at least the memory means storing the ADD and DRP information structures for setting and revising the optical channels to be added and/or dropped at the node.

15. The system according to claim 14, further comprising memory means for storing the FWD information structure; wherein the management unit is capable of selectively overriding at least one of the memory means storing said RCV and FWD information structures.

16. The system according to claim 11, wherein the processing unit is capable of explicitly determining the NOC using the FWD information structure, and capable of forming an output power control command to adjust output power of the node according to said NOC.

17. The system according to claim 11, adapted to balance operation of the node in case of a fiber cut before the node and further comprising:

means for monitoring LOS (Loss Of Signal) at the node input for detecting a fiber cut condition, and wherein said processing unit being adapted to calculate the FW structure according to the following logic:

$$FWD=\{[RCV-DRP] \text{ and } [\text{not } (LOS)]\}+ADD.$$

18. The system according to claim 17, wherein said RCV and FWD are respectively received and transmitted via a supervisory channel being an optical channel established between the nodes along with the information optical channels and using the same physical carrier as said informational optical channels use; and wherein the means for monitoring LOS at the node input comprises the LOS-line detection means for monitoring LOS on the information optical channels, and also the supervisory channel monitoring means for detecting a LOS-sup condition indicating Loss Of Signal in the supervisory channel incoming said node, said processing unit being adapted to calculate the FWD information structure according to the following formula:

$$FWD=\{[RCV-DRP] \text{ and } [\text{not } (LOS\text{-line and } LOS\text{-sup})]\}+ADD.$$

19. The system according to claim 11, wherein the means for storing at the node said RCV, DRP, ADD and FWD are four binary registers for respectively presenting the information optical channels received at the node (RCV), dropped at the node (DRP) added at the node(ADD) and forwarded from the node (FWD) in the form of binary maps, structure of said four registers being similar and such that each information optical channel of the multi-channel optical network is represented in one-to one correspondence by a particular binary position in any of the binary registers, the processing unit being capable of calculating the number of information optical channels (NOC) to be forwarded from said node to the following node, using the binary map stored in the register FWD.

20. The system according to claim 19, wherein the processing unit in the node is capable of building the FWD binary map per bit, based on the Boolean function:

$$FWD=\{[RCV \text{ xor } DRP] \text{ and } [\text{not } (LOS)]\} \text{ or } ADD, \text{ where:}$$

the binary maps RCV, FWD, ADD DRP are binary words having lengths in bits, being not smaller than the total number of channels in said multi-channel network; each particular bit of a binary word acquiring the value 1 if the corresponding channel is present, and the value 0 if the channel is absent in the particular binary map; the signal LOS is "1" when a fiber cut condition is detected.

* * * * *